(12) United States Patent
Hasagic

(10) Patent No.: US 10,518,694 B2
(45) Date of Patent: Dec. 31, 2019

(54) LENS FOR A VEHICLE HEADLAMP

(71) Applicant: Volvo Car Corporation, Göteburg (SE)

(72) Inventor: Samir Hasagic, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/171,416

(22) Filed: Oct. 26, 2018

(65) Prior Publication Data

US 2019/0143878 A1 May 16, 2019

(30) Foreign Application Priority Data

Nov. 15, 2017 (EP) ...................................... 17201895

(51) Int. Cl.
| | |
|---|---|
| *B60Q 1/00* | (2006.01) |
| *F21S 41/20* | (2018.01) |
| *B60S 1/60* | (2006.01) |
| *B60S 1/50* | (2006.01) |
| *B60S 1/52* | (2006.01) |
| *B60Q 1/04* | (2006.01) |

(52) U.S. Cl.
CPC ......... *B60Q 1/0005* (2013.01); *B60Q 1/0017* (2013.01); *B60Q 1/04* (2013.01); *B60S 1/50* (2013.01); *B60S 1/52* (2013.01); *B60S 1/60* (2013.01); *B60S 1/603* (2013.01); *F21S 41/285* (2018.01)

(58) Field of Classification Search
CPC ...... B60Q 1/0005; B60Q 1/0017; B60Q 1/04; B60S 1/50; B60S 1/52; B60S 1/60; B60S 1/603; B60S 41/285
See application file for complete search history.

(56) References Cited

U.S. PATENT DOCUMENTS 3,295,004 A * 12/1966 Hirsch ...................... B60S 1/52
15/250.002
3,915,385 A * 10/1975 Hassinger ................ B60S 1/52
239/284.2

(Continued)

FOREIGN PATENT DOCUMENTS

EP          1726498 A1    11/2006

OTHER PUBLICATIONS

Apr. 18, 2018 European Search Report issue on International Application No. EP 17201895.

*Primary Examiner* — Peggy A Neils
(74) *Attorney, Agent, or Firm* — Clements Bernard Walker; Christopher L. Bernard

(57) ABSTRACT

A lens for a vehicle headlamp, the lens comprising an inner surface and an outer surface. A cleaning arrangement is arranged to provide a cleaning fluid to the outer surface of the lens. An inlet is connectable to a cleaning fluid hose for providing cleaning fluid to the cleaning arrangement. The cleaning arrangement comprises: a channel and an array of outlets in fluid communication with the channel. The channel is attached to the lens and is adapted to transport the cleaning fluid from the inlet to the array of outlets which are located on the outer side of the lens on the same side as the outer surface for providing the cleaning fluid to the outer surface of the lens. The invention also relates to a headlamp arrangement and a vehicle.

15 Claims, 5 Drawing Sheets

(56) References Cited

U.S. PATENT DOCUMENTS

| | | | | |
|---|---|---|---|---|
| 3,939,523 | A | * | 2/1976 | Kolbe .................... B60S 1/603 15/250.02 |
| 4,088,358 | A | * | 5/1978 | Hirsch .................... B60S 1/603 239/284.2 |
| 4,285,470 | A | | 8/1981 | Roth |
| 10,099,658 | B1 | * | 10/2018 | Chupp .................... B60S 1/603 |
| 2001/0030874 | A1 | | 10/2001 | Nishiyama et al. |
| 2001/0048038 | A1 | | 12/2001 | Pfalzgraf |
| 2018/0339681 | A1 | * | 11/2018 | Salter .................... B60Q 1/0064 |

* cited by examiner

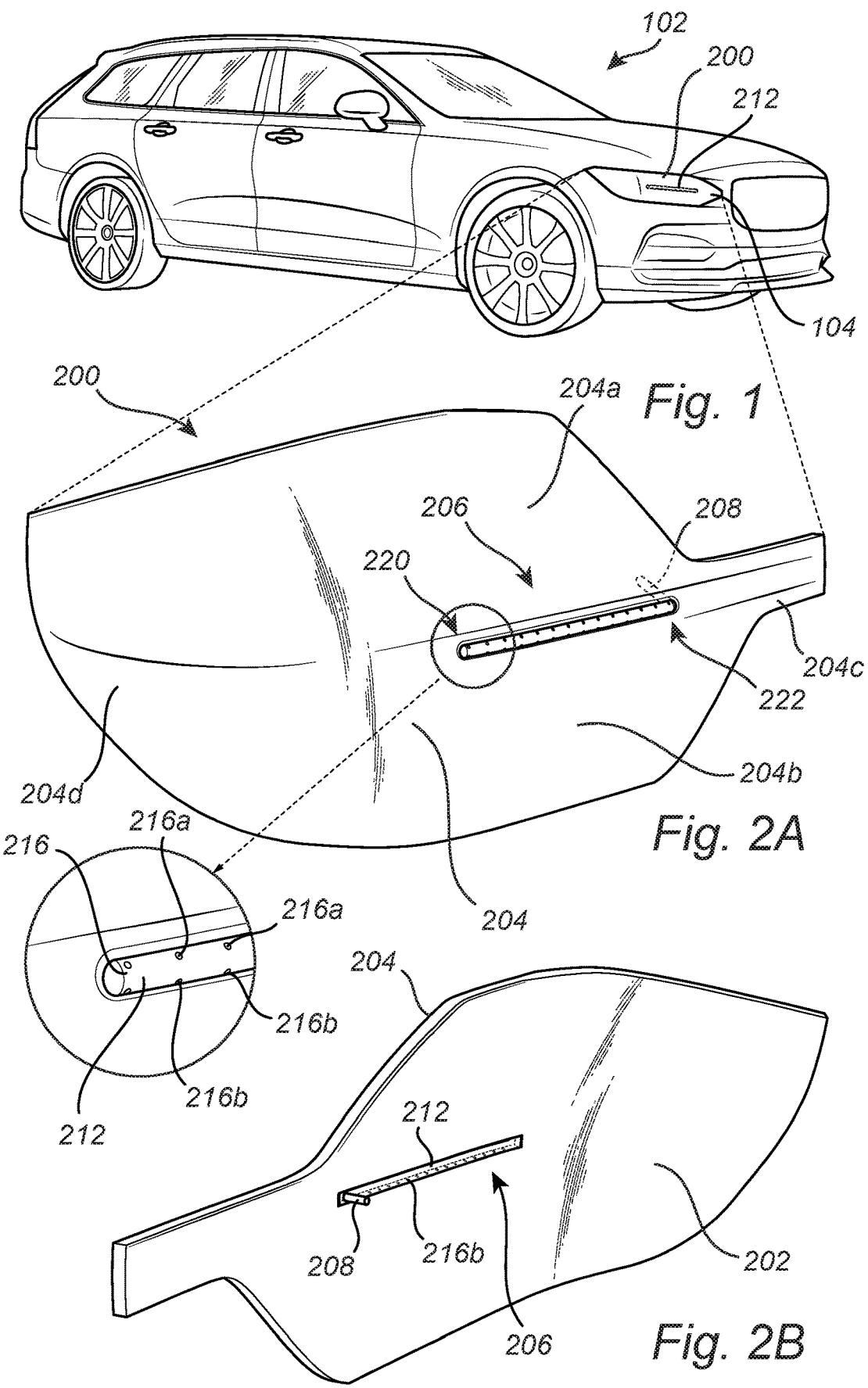

LENS FOR A VEHICLE HEADLAMP

CROSS-REFERENCE TO RELATED APPLICATION

The present patent application/patent claims the benefit of priority of co-pending European Patent Application No. 17201895.4, filed on Nov. 15, 2017, and entitled "A LENS FOR A VEHICLE HEADLAMP," the contents of which are incorporated in full by reference herein.

FIELD OF THE INVENTION

The present invention relates to a lens for a vehicle headlamp. The present invention also relates to headlamp arrangement comprising such a lens and to a vehicle comprising a headlamp arrangement.

BACKGROUND OF THE INVENTION

A vehicle headlamp generally comprises a set of light sources arranged in a compartment. The light sources may be used for providing high beam lighting, low beam lighting, directional lights, parking lights, etc. for the associated vehicle. In the compartment there may further be reflectors for directing the light in a specific direction and other electronic or optical components.

An optically transmissive lens may be arranged to seal the compartment. In addition to protecting the light sources and other components such as electrical and optical components mounted inside the compartment, the lens may provide further optical effects for enhancing the lighting performance of the headlamp.

The lens provides the boundary between the outside environment and the inside compartment of the headlamp, it is therefore also subject to dirt such as mud and dust from the outside environment. For this reason are most vehicles equipped with some kind of headlamp cleaning system. A prior art headlamp with a headlamp cleaning system is disclosed in US2001/0048038.

Generally a head lamp cleaning system comprises a nozzle for spraying a washer fluid to the lens. The nozzle is often arranged on a supporting arm which can be moved (e.g. a telescope arm) such that the nozzle can reach the outside surface of the lens and apply the washer fluid to the lens outside surface. The supporting arm is typically operated by a motor. In some headlamp cleaning systems the supporting arm is protected behind a lid when in a withdrawn position. The lid then has to open to allow the supporting arm to be ejected in order for it to reach in front of the lens for cleaning the outside surface of the lens.

However, such headlamp cleaning systems comprises several moving parts which are inclined to get stuck or in other ways malfunction with regards to operating the opening/closing or the lid, or moving the supporting arm. Furthermore, prior art headlamp cleaning systems requires a relatively large amount of mounting space.

Accordingly, it appears that headlamp cleaning systems for vehicles may be improved in several mays.

SUMMARY

In view of above, it is an object of the present invention to provide lens for a headlamp which alleviates at least one of the above mentioned problems in prior art.

According to a first aspect of the invention, there is provided a lens for a vehicle headlamp comprising a light source holder, the lens comprising: an inner surface adapted to face the light source holder when mounted in a headlamp; a cleaning arrangement for providing a cleaning fluid to an outer surface of the lens, a inlet connectable to a cleaning fluid hose for providing cleaning fluid to the cleaning arrangement, the inlet is arranged on the same side of the lens as the inner surface, the inlet is arranged on the same side of the lens as the inner surface, wherein the cleaning arrangement comprises: a channel and an array of outlets in fluid communication with the channel, the channel is attached to the lens and is adapted to transport the cleaning fluid from the inlet to the array of outlets, the outlets being located on the outer side of the lens on the same side as the outer surface for providing the cleaning fluid to the outer surface of the lens.

The present invention is based on the realization that the cleaning arrangement comprising a channel and outlets for providing the cleaning fluid to the lens outer surface may be attached to the lens itself. The channel may for example be integrated with the lens, or the channel may be attached to the lens as a separate part, or even attached on the outer surface of the lens. The location of the channel and its outlets may in this way provide for improved cleaning of the lens due to its proximity with the lens outer surface. Furthermore, the shape and location of the channel itself may be tailored depending on the design and shape of the lens. In addition, since the channel and the outlets are attached to the lens, the movable parts which may malfunction associated with the prior art systems are no longer needed.

In prior art systems, the supporting arm which is commonly a telescoping arm movable to a location in front of the lens is stored in a pocket near the lens. With the inventive concept, this pocket is no longer required, and thus improved integration of the lens cleaning system is possible with the inventive concept. A further advantage is that the front bumper of the vehicle is easier to mount since the pocket is often located below the lens and directly above the front bumper. Without the pocket, more space is available for the front bumper.

Accordingly, advantages with the invention include improved cleaning of the lens outer surface, and reduced or eliminated need for movable parts that may malfunction, and improved integration.

The light source holder comprises an arrangement for mechanically holding a light source in place in the headlamp and electrical circuitry for providing electrical power to the light source.

A light source may be for example a halogen light emitting device, a light-emitting diode (LED), or any other suitable light emitting device for vehicle exterior lights.

The inner surface of the lens and the outer surface of the lens may be opposite to each other meaning that the inner surface faces to an inside compartment of the headlamp where the light source holder is located, and the outer surface faces to the outside of the compartment, when the lens is arranged in a headlamp. It is the outer surface that is exposed to dirt from the outside environment and that is generally in need of cleaning using the cleaning arrangement. The outer surface may at least locally face in an opposite direction compared to the inner surface.

The inlet for connecting a cleaning fluid hose to the cleaning arrangement is reachable from the inner side of the lens. Accordingly, when the lens is arranged in a headlamp arrangement, the cleaning fluid hose may be connected to the cleaning arrangement from inside the compartment accommodating the light source holder.

The location of the channel is such as to clean a relatively large portion of the outer surface of the lens such that a light source arranged in the headlamp may provide adequate lighting for illuminating the road ahead of the vehicle.

The cleaning arrangement is advantageously made from an optically transmissive material, such as the same material as the lens material. The material of the lens may comprise e.g. a plastic material. Materials for the lens are known per se in the art. The lens may be manufactured by injection molding techniques.

In one possible implementation of the inventive concept, the cleaning arrangement may be embedded in the lens material whereby the channel lies in the lens material and the outlets are formed in the lens material. Accordingly, the channel and the outlets may be made in one piece with the lens and is in this way fully integrated in the lens. Accordingly, the cleaning arrangement is in-separable from the lens itself which facilitates mounting of the cleaning arrangement with since it is mounted (e.g. on a vehicle, or a headlamp) at the same time as the lens. Furthermore, the number of movable parts is advantageously kept low.

In another possible implementation of the inventive concept, the lens may comprise a through-opening from the inner surface to the outer surface, wherein the cleaning arrangement is a releasably attached in the through-opening to seal the through-opening. Thus, the cleaning arrangement is separable from the lens. However, in use, the cleaning arrangement is mounted in the through-opening with the outlets on the outer side of the lens, i.e. the same side as the outer surface. If needed, the cleaning arrangement may in this possible implementation be replaced or removed for maintenance. The cleaning arrangement may be attached in the through-opening using e.g. screws tightened to the lens material, or by a spring arrangement.

The channel may be arranged along one axis. Accordingly, the channel may be a relatively straight channel. Further the array of outlets may be arranged such that the outlets are distributed from a first end portion to a second end portion of the channel.

In some embodiments, the outlets of the array of outlets are evenly spread along the channel.

In other embodiments, the spacing between outlets in a first subset of outlets may be different from the spacing between outlets in a second subset of outlets. For example, it may be advantageous to provide more cleaning fluid to portions of the outer surface of the lens which are more important to clean than other portions. A central portion of the lens may for example be located such that more light is meant to be transmitted through the lens compared to through side portions of the lens. The central portions may therefore be cleaned with higher priority. Furthermore, some outer surface portions of the lens may be more prone to get dirty and may thus be in need of more cleaning fluid whereby a higher density of outlets may advantageously be used for cleaning such outer surface portions.

In embodiments in accordance with the inventive concept, the array of outlets may comprise a first set of outlets arranged to provide cleaning fluid to a first portion of the outer surface of the lens, and a second set of outlets arranged to provide cleaning fluid to a second portion of the outer surface of the lens, the second portion being different from the first portion. For example the first and the second portions of the lens may be on two different sides or the channel and thus providing coverage for cleaning fluid to the different portions of the lens with respect to different sides of the channel. The first set of outlets and the second set of outlets may be facing in different directions.

The first portion may be an upper portion of the outer surface of the lens and the second portion may be a lower portion of the outer surface of the lens. The channel may for example be arranged along a generally horizontal axis. The horizontal axis is here with respect to when the lens in mounted in a headlamp which is mounted in vehicle standing on a horizontal ground. The upper portion is then above the channel and the lower portion is below the channel. Accordingly, the first set of outlets may be facing towards the upper portion of the lens outer surface and the second set of outlets may be facing towards the lower portion of the lens outer surface.

The first portion and the second portion may be non-overlapping portions. Accordingly the first portion and the second portion may be two distinct surface portions of the outer surface of the lens.

Generally, the channel is arranged such that the array of outlets may provide cleaning fluid to a generally central portion of the outer surface of the lens. This provides improved cleaning for the portion of the lens where a large portion of light is transmitted through the lens. In other words, improved illumination of the region ahead of or behind the vehicle is possible.

The channel may be generally parallel with at least one of the lens inner surface or the lens outer surface. Accordingly, the channel is arranged along the shape of at least one of the lens inner surface or the lens outer surface.

In order to cover a relatively large portion of the outer surface of the lens for cleaning, the length of the channel is at least about half the side-to-side distance of the outer surface of the lens. In possible embodiments, the channel is arranged from one side portion to another side portion of the lens.

According to a second aspect of the invention, there is provided a headlamp arrangement for a vehicle, the head lamp arrangement comprising the lens according to first aspect and embodiments thereof, and a housing for accommodating the light source holder, wherein the lens is adapted to seal an opening in the housing.

Thus, the lens is arranged such that light emitted by a light source arranged in the light source holder in the housing is transmitted through the lens.

The headlamp arrangement may comprise a hose connectable to the inlet for providing a cleaning fluid to the inlet from a cleaning fluid container for holding a reservoir of cleaning fluid.

This second aspect of the invention provides similar advantages as discussed above in relation to the previous aspect of the invention.

According to a further aspect of the inventive concept, there is provided a vehicle comprising at least one headlamp arrangement according to the second aspect and embodiments thereof, the vehicle further comprising a cleaning fluid container for holding a reservoir of cleaning fluid.

This third aspect of the invention provides similar advantages as discussed above in relation to the previous aspects of the invention.

In summary the present invention relates to a lens for a vehicle headlamp, the lens comprising an inner surface and an outer surface. A cleaning arrangement is arranged to provide a cleaning fluid to the outer surface of the lens. An inlet is connectable to a cleaning fluid hose for providing cleaning fluid to the cleaning arrangement. The cleaning arrangement comprises: a channel and an array of outlets in fluid communication with the channel. The channel is attached to the lens and is adapted to transport the cleaning fluid from the inlet to the array of outlets which are located on the outer side of the lens on the same side as the outer surface for providing the cleaning fluid to the outer surface of the lens. The invention also relates to a headlamp arrangement and a vehicle.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein:

FIG. 1 schematically illustrates a vehicle comprising headlamp arrangement;

FIG. 2A-B shows conceptual views of a lens according to embodiments of the invention;

DETAILED DESCRIPTION OF EXAMPLE EMBODIMENTS

Figure 3:
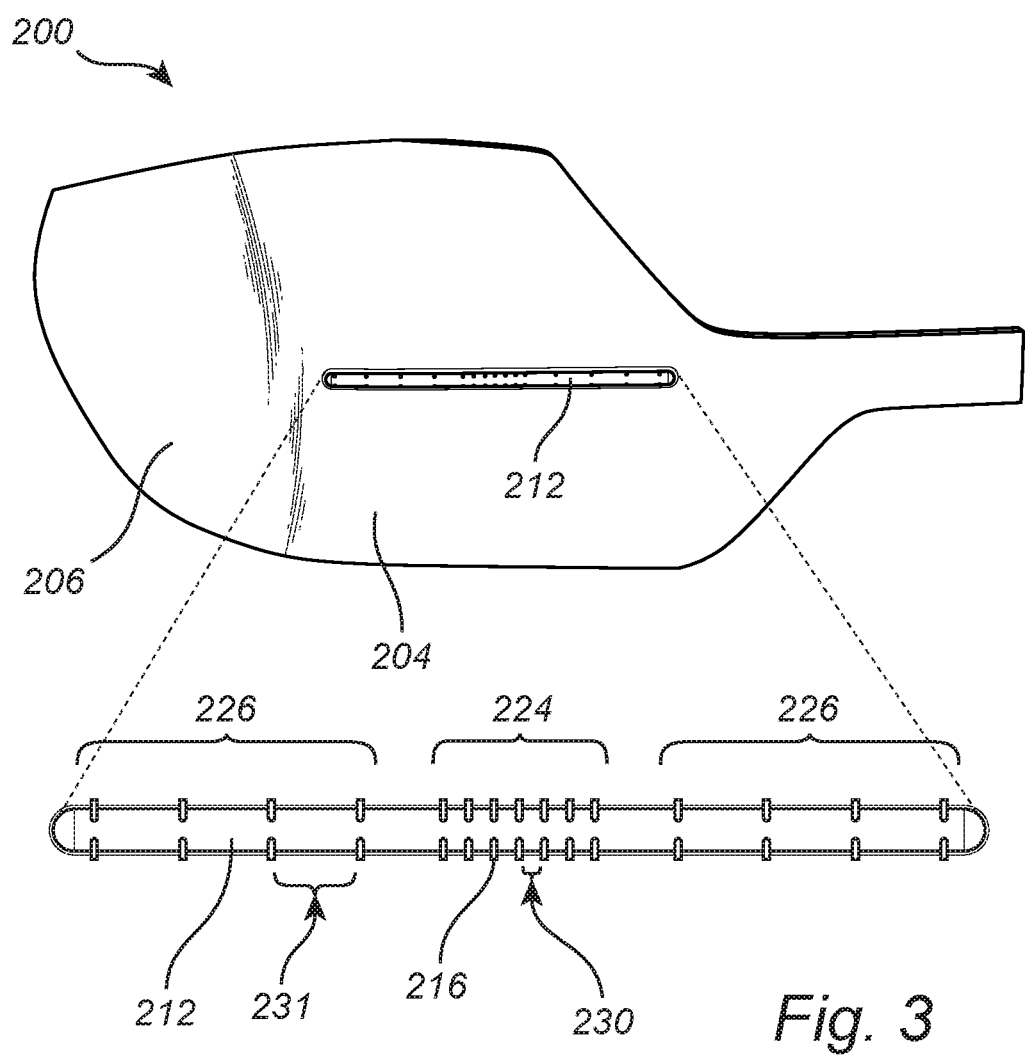
FIG. 3 is a conceptual view of a lens according to embodiments of the invention.

In the present detailed description, various embodiments of inventive concept are mainly described with reference to the headlamps of a vehicle in the form of a car. However, the present invention may equally be used for any other type vehicle such as e.g. a bus, a truck, etc. Furthermore, the invention is equally applicable to the rear lamps (e.g. the tail lights) of a vehicle. Thus, this invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 shows a vehicle in the form of a car 102. The car 102 comprises a headlamp 104 arranged to provide illumination ahead of the car 102. The headlamp 104 is generally in communication with a vehicle electrical system such that an operator of the car 102 may control the lighting state of the headlamp. For example, such lighting state may be to turn the direction lights on or off, or control the high-beam/low-beam state of the main lights.

The headlamp 104 comprises a lens 200 having an outer surface 204 facing outside of the headlamp 104, best seen in FIG. 2A. The outer surface 204 is thus exposed to the outside environment and my therefore get dirty and may sometimes be in need of cleaning.

The lens 200 comprises a cleaning arrangement which will be described further with reference to subsequence drawings. However, in FIG. 1 a channel 212 of the cleaning arrangement is shown and is integrated with the lens 200. In this particular example embodiment, the channel 212 is arranged along in a generally horizontal axis.

The car 102 comprises a cleaning fluid container (not shown) for holding the cleaning fluid. Further, a cleaning fluid hose (not shown) is arranged to transfer the cleaning fluid from the cleaning fluid container to an inlet (not shown) of the cleaning arrangement 110. The cleaning fluid is transferred from the cleaning fluid container to the cleaning fluid arrangement 110 via the hose by e.g. pressurizing the cleaning fluid in the cleaning fluid container, or by any other means known in the art.

FIG. 2A-B conceptually illustrates two views of the lens 200 according to embodiments in accordance with the inventive concept. The lens 200 is adapted to be arranged for a headlamp, e.g. the headlamp 104 for the vehicle in FIG. 1. The lens 200 has an inner surface 202 facing a light source holder when mounted in the headlamp 104, and an outer surface 204. At least locally, the inner surface 202 faces a direction opposite the outer surface 204. It is the outer surface 204 that faces the outside environment and may therefore be in need of cleaning since it may be exposed to dirt and dust from the outside environment.

For cleaning of the outer surface 204 the lens 200 comprises a cleaning arrangement 206. The cleaning arrangement 206 is adapted for providing a cleaning fluid to the outer surface 204 of the lens 200. The cleaning fluid is provided to the cleaning arrangement 206 at an inlet 208. The inlet 208 is adapted to receive a cleaning fluid hose (not shown) which is configured to transfer the cleaning fluid to the cleaning arrangement 206 from a cleaning fluid container (not shown). The inlet 208 is located on the same side of the lens as the inner surface 202. In other words, the inlet 208 is arranged facing the inside of a compartment of the headlamp when the lens is arranged in a headlamp. It is inside the compartment that the light sources are mounted when the headlamp is in place for use in a vehicle.

The cleaning arrangement 206 comprises a channel 212 and an array of outlets 216 (including 216a-b). The outlets 216 are in fluid communication with the channel 212 and the channel is in fluid communication with the inlet 208 such that fluid may be transported from the inlet 208 to the outlets 216 via the channel 212 to be distributed on the outer surface 204 of the lens 200.

The channel 212 and the outlets are attached to the lens 200. In this example embodiment illustrated in FIGS. 2A-B, the channel 212 and the outlets 216 are made in the same piece as the lens 200. In other words, the channel 212 runs through the material of the lens and the outlets 216 are formed in the lens material and in fluid communication with the channel 212. The cleaning arrangement 206 is in this way fully integrated with the lens 200.

The array of outlets 216 are distributed from a first end portion 220 of the channel 212, to a second end portion 222 of the channel 212. The outlets 216 may be evenly spread along the channel 212, i.e. spaced apart from each other at the same distance across the array of outlets 216.

However, in further possible implementations the spacing between outlets may vary across the array of outlets 216, as is illustrated in FIG. 3. For example, there may be portions of the outer surface 204 that requires higher priority for cleaning than others. The outlets arranged to provide cleaning fluid to the higher priority portions may more closely spaced apart. In the example embodiment illustrated in FIG. 3, the spacing 230 between the outlets 216 in a subset of outlets 224 is smaller than the spacing 231 between outlets 216 in another subset 226 of outlets. The outlets in the subset 224 with the smaller inter-spacing are arranged closer to the center of the channel 212 which in this example embodiment is closer to the center of the lens 200. The center portion of the lens 200 may be more important to maintain clean than the outer portions of the lens 200, thus more outlets are here (FIG. 3) shown arranged close to the center of the lens 200.

Returning now to FIG. 2A-B, there is a first set of outlets 216a which are arranged to provide cleaning fluid to a first portion 204a of the outer surface 204 and a second set of outlets 216b arranged to provide cleaning fluid to a second portion 204b of the outer surface 204 of the lens 200. In the example embodiment in FIG. 2 the first portion 204a is an upper portion of the lens 200 and the second portion 204b is a lower portion of the lens 200. The upper portion 204a being above the channel 212 when the lens in arranged in a headlamp arrangement mounted on a vehicle, and the lower portion 204b being below the channel 212, in other words, the upper portion 204a and the lower portion 204b are on opposite sides of the channel 212.

The channel 212 is generally parallel with at least one of the inner surface 202 or the outer surface 204. In other words the channel is configured to transport cleaning fluid in a direction generally parallel with the outer surface 204 or the inner surface 202, or even in a direction generally parallel with the outer surface 204 and the inner surface 202, or at least parallel with local regions of the outer surface 204 and/or the inner surface 202.

The channel 212 may be arranged in a direction generally parallel with a side-to-side direction of the outer surface 204 of the lens 200. The side-to-side direction is from a first side 204c to a second side 204d of the lens outer surface 204.

Figure 4A:
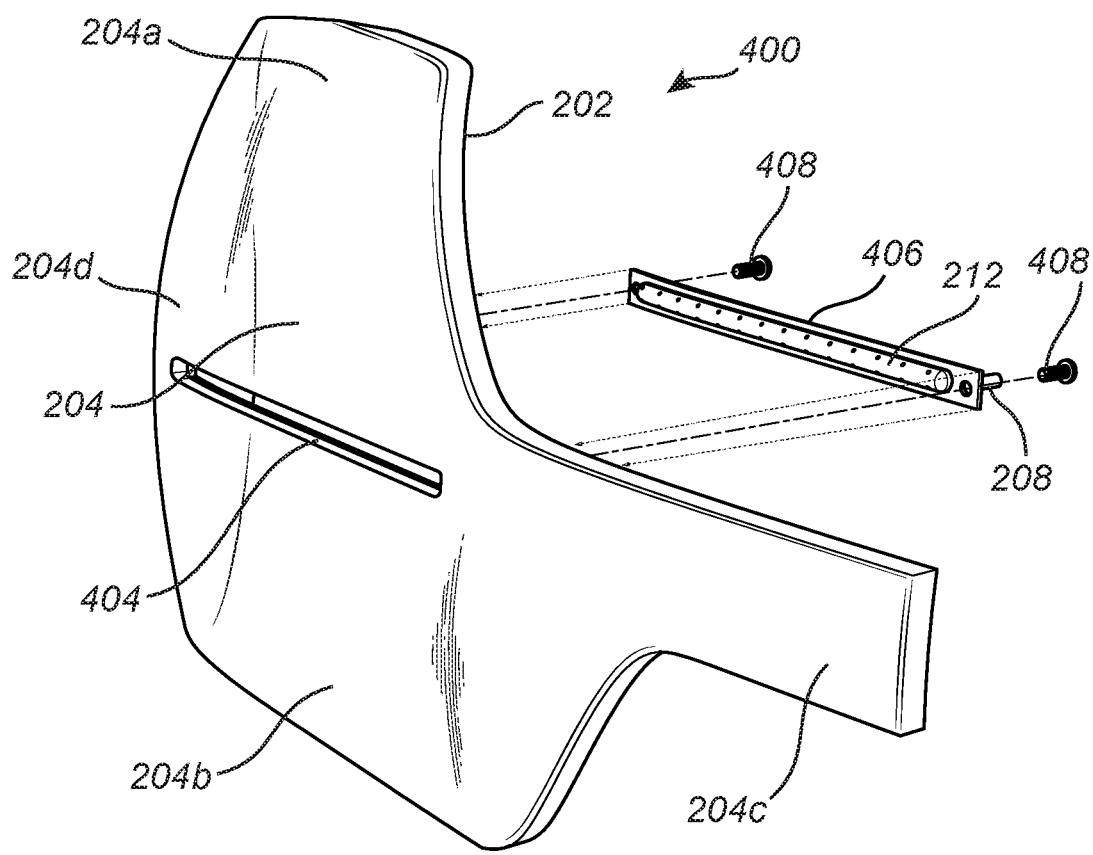
FIG. 4A-B shows conceptual views of a lens according to embodiments of the invention.
Figure 4B:
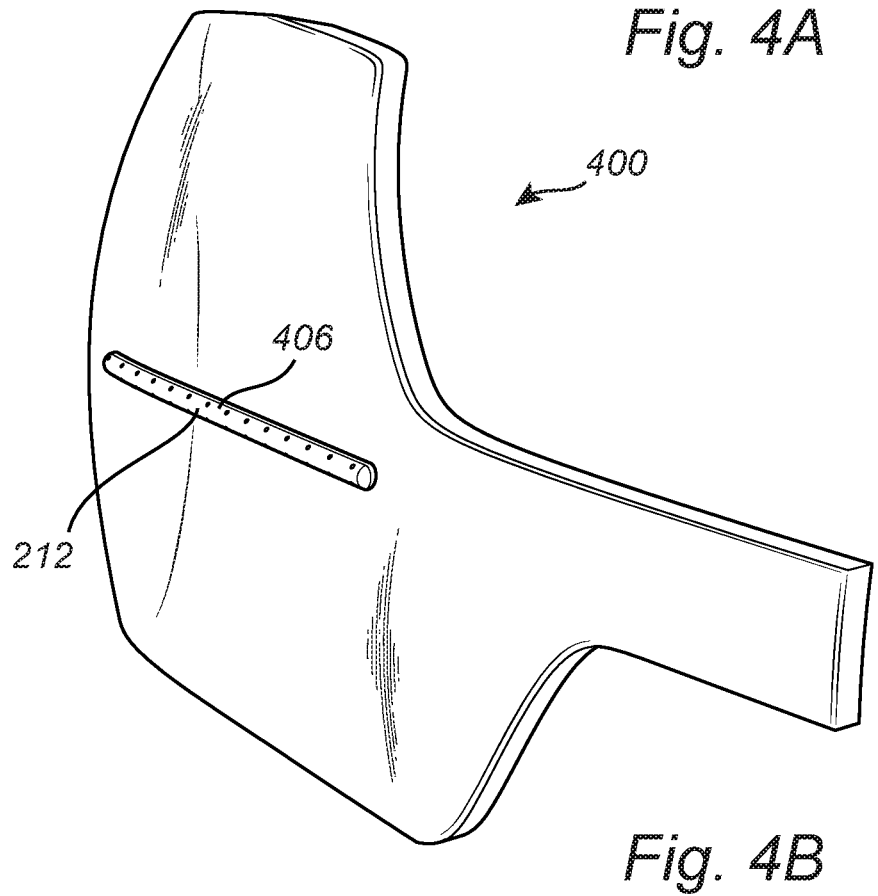

FIG. 4A-B schematically illustrates two views of a further embodiment in accordance with the inventive concept. In FIG. 4A-B, there is shown a lens 400 which comprises a through-opening 404 through the lens 400. The through-opening 404 goes between the inner surface 202 to the outer surface 204 of the lens 400. Features in FIG. 4A-B with reference numerals that are the same as in FIGS. 2 and 3 will not be described again instead refer to the description of FIG. 2A-B and FIG. 3.

The cleaning arrangement 406 comprises the channel 212 and the array of outlets as described with reference to FIGS. 2 and 3. However, in the example embodiment of FIG. 4, the cleaning arrangement 406 is provided as a separate part and is releasably attached to the lens 400 in the through-opening 404. The cleaning arrangement 406 is here shown to be attached to the lens 400 by means of screws 408, however other means of attachment such as springs or bayonet mount are possible and within the scope of the invention.

Figure 5:
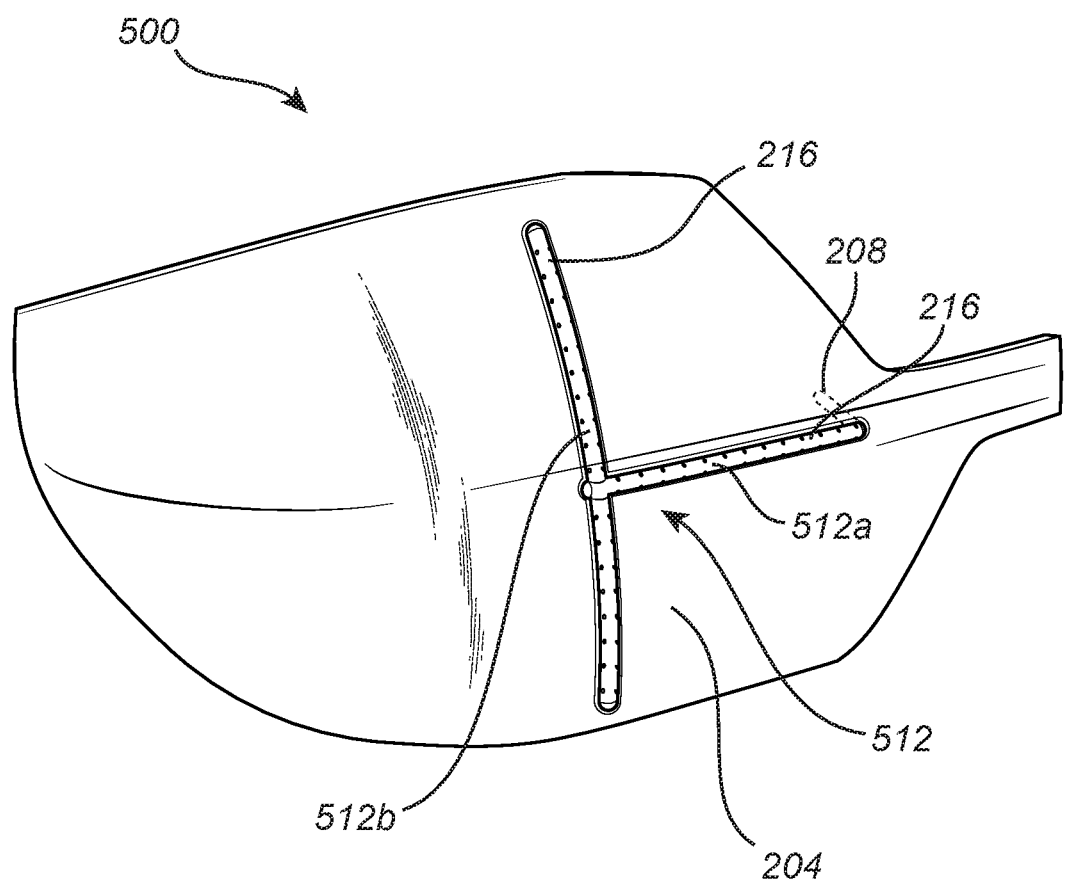
FIG. 5 is a conceptual view of a lens according to embodiments of the invention.

In FIGS. 2A-B, 3, and 4A-B, the channel 212 of the cleaning arrangement 206 are illustrated as a single straight segment. However, the channel may in other possible implementations comprise more than one segment having the array of outlets 216 arranged in each of the segments. For example, FIG. 5 illustrates a lens 500 comprising a channel 512 having two segments 512a and 512b. The segments 512a and 512b are in fluid communication with each other. Thus, cleaning fluid provided to the inlet 208 is transported by the segment 512a to the segment 512b. The cleaning fluid is distributed by the outlets 216 in both segments 512a and 512b to the outer surface 204 of the lens 500.

Figure 6:
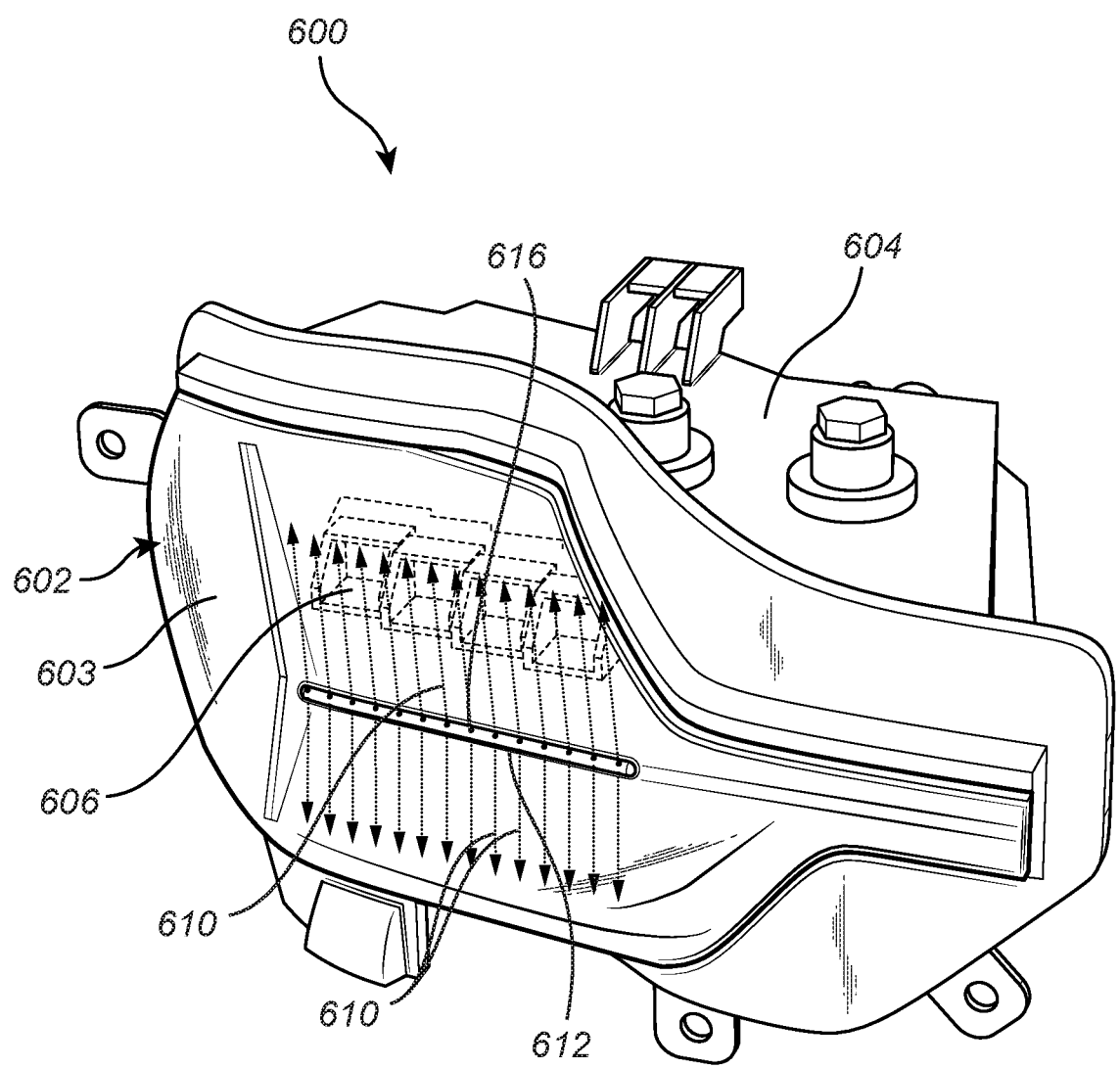
FIG. 6 conceptually illustrates a headlamp arrangement.

FIG. 6 conceptually illustrates a headlamp arrangement 600 comprising a lens 602 according to any one of the described embodiments. However, here in this example embodiment, the lens 602 is conceptually illustrated as the lens 200 or 400 for example purposes.

The headlamp arrangement 600 comprises a housing 604 accommodating a light source holder 606. An inner surface of the lens 602 faces the light source holder 606. The lens 602 further has an outer surface 603. A hose (not shown) inside the headlamp arrangement 600 provides a cleaning fluid to cleaning arrangement of the lens 602 from a cleaning fluid container (not shown). Jets 610 of cleaning fluid are shown in FIG. 6 for illustrative purposes.

The cleaning fluid may be pressurized and is thus forced through the cleaning fluid hose to the cleaning arrangement channel 612. The cleaning fluid is thereby sprayed out from the outlets 616 (only one is numbered) as jets 610 of cleaning fluid for distributing the cleaning fluid on the outer surface of the lens.

The material of the lens may comprise e.g. a plastic material. Materials for the lens are known per se in the art.

The material of the housing may comprise e.g. plastic or metallic materials, known per se in the art.

The person skilled in the art realizes that the present invention by no means is limited to the preferred embodiments described above. On the contrary, many modifications and variations are possible within the scope of the appended claims. For example, the lens may comprise several (i.e. more than one) channels having associated inlets and outlets.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A lens for a vehicle headlamp comprising a light source holder, the lens comprising:
   an inner surface adapted to face the light source holder when mounted in a headlamp;
   a cleaning arrangement for providing a cleaning fluid to an outer surface of the lens, and
   a inlet connectable to a cleaning fluid hose for providing cleaning fluid to the cleaning arrangement, the inlet is arranged on the same side of the lens as the inner surface, the inlet is also arranged such that it is disposed within a housing to which the lens is adapted to be attached when the lens is attached to the housing,
   wherein the cleaning arrangement comprises:
   a channel and an array of outlets in fluid communication with the channel, the channel is attached to the lens and is adapted to transport the cleaning fluid from the inlet to the array of outlets through the lens within the housing when the lens is attached to the housing, the outlets being located on the outer side of the lens on the same side as the outer surface for providing the cleaning fluid to the outer surface of the lens.

2. The lens according to claim 1, wherein the cleaning arrangement is embedded in the lens material whereby the channel lies in the lens material and the outlets are formed in the lens material.

3. The lens according to claim 1, wherein the lens comprises a through-opening from the inner surface to the outer surface, wherein the cleaning arrangement is a releasably attached in the through-opening to seal the through-opening.

4. The lens according to claim 1, wherein the array of outlets is distributed from a first end portion to a second end portion of the channel.

5. The lens according to claim 1, wherein the array of outlets comprises a first set of outlets arranged to provide cleaning fluid to a first portion of the outer surface of the lens, and a second set of outlets arranged to provide cleaning fluid to a second portion of the outer surface of the lens, the second portion being different from the first portion.

6. The lens according to claim 5, wherein the first portion is an upper portion of the outer surface of the lens and the second portion is a lower portion of the outer surface of the lens.

7. The lens according to claim 5, wherein the first portion and the second portion are non-overlapping portions.

8. The lens according to claim 1, wherein the outlets of the array of outlets are evenly spread along the channel.

9. The lens according to claim 1, wherein the spacing between outlets in a first subset of outlets is different from the spacing between outlets in a second subset of outlets.

10. The lens according to claim 1, wherein the channel is generally parallel with at least one of the lens inner surface or the lens outer surface.

11. The lens according to claim 1, wherein the channel is arranged such that the array of outlets may provide cleaning fluid to a generally central portion of the outer surface of the lens.

12. The lens according to claim 1, wherein the length of the channel is at least about half the side-to-side distance of the outer surface of the lens.

13. A headlamp arrangement for a vehicle, the head lamp headlamp arrangement comprising the lens according to claim 1, and the housing for accommodating the light source holder, wherein the lens is adapted to seal an opening in the housing.

14. The headlamp arrangement according to claim 13, comprising a hose connectable to the inlet for providing a cleaning fluid to the inlet from a cleaning fluid container for holding a reservoir of cleaning fluid.

15. A vehicle comprising at least one headlamp arrangement according to claim 13, the vehicle further comprising a cleaning fluid container for holding a reservoir of cleaning fluid.

\* \* \* \* \*